Feb. 28, 1928.

C. C. BLAKE 1,660,952

STAPLE MAKING MACHINE

Filed Feb. 9, 1924

INVENTOR
Charles C. Blake
by Charles W. McDermott
his attorney

Feb. 28, 1928. 1,660,952
C. C. BLAKE
STAPLE MAKING MACHINE
Filed Feb. 9, 1924 5 Sheets-Sheet 4

INVENTOR
Charles C. Blake
by Charles W. McDermott
his attorney

Patented Feb. 28, 1928.

1,660,952

UNITED STATES PATENT OFFICE.

CHARLES C. BLAKE, OF BROOKLINE, MASSACHUSETTS, ASSIGNOR TO C. C. BLAKE, INCORPORATED, OF BOSTON, MASSACHUSETTS, A CORPORATION OF NEW YORK.

STAPLE-MAKING MACHINE.

Application filed February 9, 1924. Serial No. 691,627.

The present invention relates to machines for making staples and more particularly to improvements in the staple-making machine disclosed in my co-pending application, Serial No. 422,277, filed November 6, 1920.

The said prior machine is provided with a mandrel which is rotated to draw wire from a source of supply and coil the wire on the mandrel, the bends in the coils forming the heads or shoulders of a plurality of staples; a stationary cam for feeding the coils along the mandrel, and a pair of cutters for shearing the wire across the end of the mandrel intermediate each successive bend to form two complete staples at every revolution of the machine. The general principles of the machine of said co-pending application are embodied in the machine of the present invention, the object of the invention being to improve the operation of the prior machine in certain particulars.

To this end certain novel features of the present invention contemplate the provision of mechanism for readily adjusting the machine to compensate for any variations in the gauge of wire which may occur in successive reels; of improved means for stopping the advance of the wire on the mandrel under the influence of the coil feeding cam; of improved means in the tail-stock for supporting the mandrel for rotation; of improved means for supporting the coil feeding cam to make its removal and the substitution of another feeding cam for feeding coils made from a different gauge of wire a simple matter; of improved means for adjusting the tail-stock to compensate for wear on the mandrel; of improved means for ejecting the staples from the machine, and in certain devices, combinations and arrangements of parts tending to improve and simplify the operation of staple-making machines and enable them to operate with certainty and without liability of breakage of parts. The advantages of these devices, combinations and arrangements of the parts will be obvious to those skilled in the art from the following description.

The various features of the present invention will be best understood from an inspection of the accompanying drawings, illustrating the best form of the invention at present devised, in which, Figure 1 is a plan of the staple-making machine;

Figure 5:
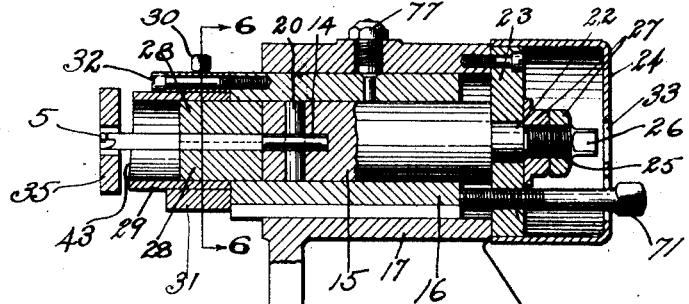
Fig. 5 is a detail in left side elevation, partly in section, of the tail stock positioned with relation to the mandrel rotator.
Figure 6:
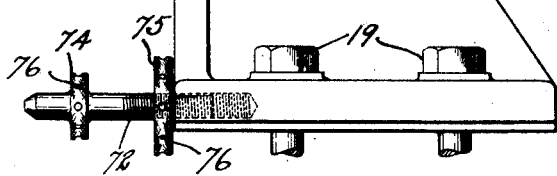
Fig. 6 is a rear sectional elevation on the line 6—6, Fig. 5.
Figure 6:
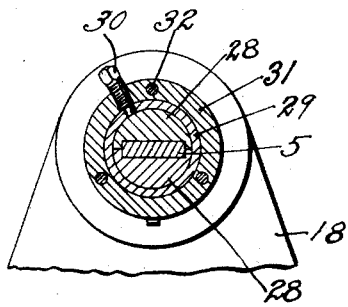
Figure 7:
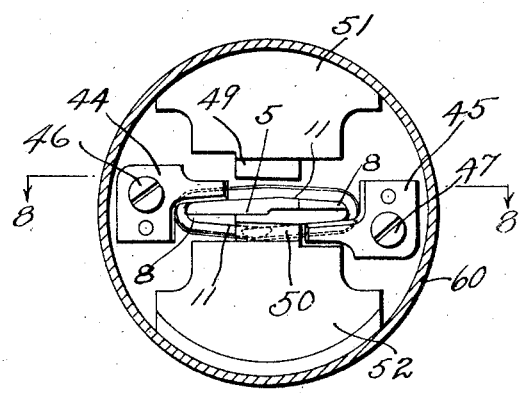
Fig. 7 is a detail in rear sectional elevation of the parts adjacent the cutting point.
Figure 9:
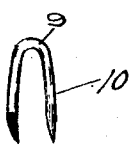
Fig. 9 is an elevation of the staple made by the machine.
Figure 10:
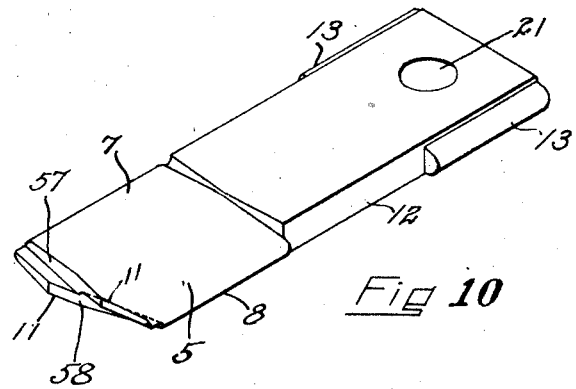
Fig. 10 is an isometric perspective of the mandrel removed from the machine.

In the illustrated embodiment of the invention the wire 1 (Figs. 1, 2, and 3) from a suitable source of supply (not shown), is led into the machine between guide rolls 2 (Figs. 1 and 2) carried by a bracket 3 secured to the supporting frame 4. From the guide-rolls 2 the wire travels to a mandrel 5 (Figs. 3, 5, 6, 7, 8 and 10). During the operation of the machine the mandrel 5 is rotated to draw the wire continuously from the source of supply and wind the wire in a plurality of coils 6 (Fig. 8) around the coil supporting surface 7 (Fig. 10). As shown in Figs. 7 and 10, the mandrel 5 is oblong in cross-section with opposite rounded edges 8 which form the heads or shoulders 9 (Fig. 9) in the coils for the subsequent formation of the staple 10. The opposite faces 11 (Fig. 7) of the mandrel 5 are reversely inclined in order to impart the proper spread to the legs of the staple 10.

The mandrel 5 is formed on one end of a flat bar 12 (Fig. 10) having a pair of shoulders 13 formed on its opposite edges. The bar 12 fits within a slot 14 (Fig. 5) formed in one end of a cylindrical support 15 rotatably mounted within a sleeve 16. The sleeve 16 is splined to slide in a bearing-like extension 17 formed on a tail-stock 18 secured by bolts 19 to the frame 4. The bolts 19 pass through elongated holes in the tail-stock so that the position of the tail-stock 18 on the frame 4 may be varied. The bar 12 is secured to the support 15 by a pin 20, carried by the support 15, which passes through a hole 21 (Fig. 10) formed in the bar 12.

The rear end of the support 15 is provided with a reduced neck 22 (Fig. 5) which rotates in a bearing 23 secured to the front of the extension 17. The neck 22 extends beyond the bearing into a hollow cap 24 where it is provided with screw-threads 25 terminating in a square nut 26. The screw-threads 25 are engaged by a pair of adjusting and locking nuts 27. To insure the proper alignment of the mandrel 5 the bar 12, in front of the shoulders 13, is embraced by a pair of cylindrical fillers 28 (Figs. 5 and 6) which rotate both within the sleeve 16 and a tube 29 (Fig. 5). The tube 29 is held in place by a bolt 30 carried by a collar 31 which surrounds the tube 29. The collar 31 is secured by three screws 32 to the front end of the sleeve 16.

Figure 8:
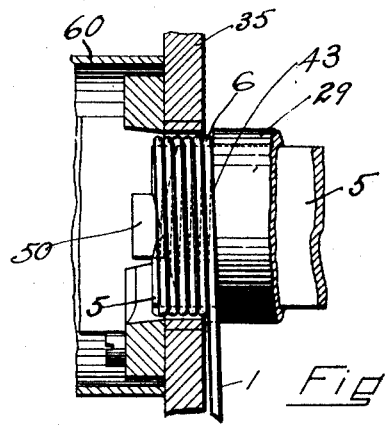
Fig. 8 is a detail in sectional plan on the line 8—8, Fig. 7.

To prepare the mandrel 5 for rotation the free end of the wire extending through the feed rolls 2 is bent over the mandrel and then the mandrel 5 is rotated by hand to draw more wire from the supply and coil it into the six coils provided by the wire supporting surface 7. To this end a crank device (not shown) is inserted through an opening 33 (Fig. 5) in the cap 24 and engaged with the square nut 26, and then the mandrel is rotated to form the six coils thereon and position them as shown in Figs. 3 and 8.

Figure 2:
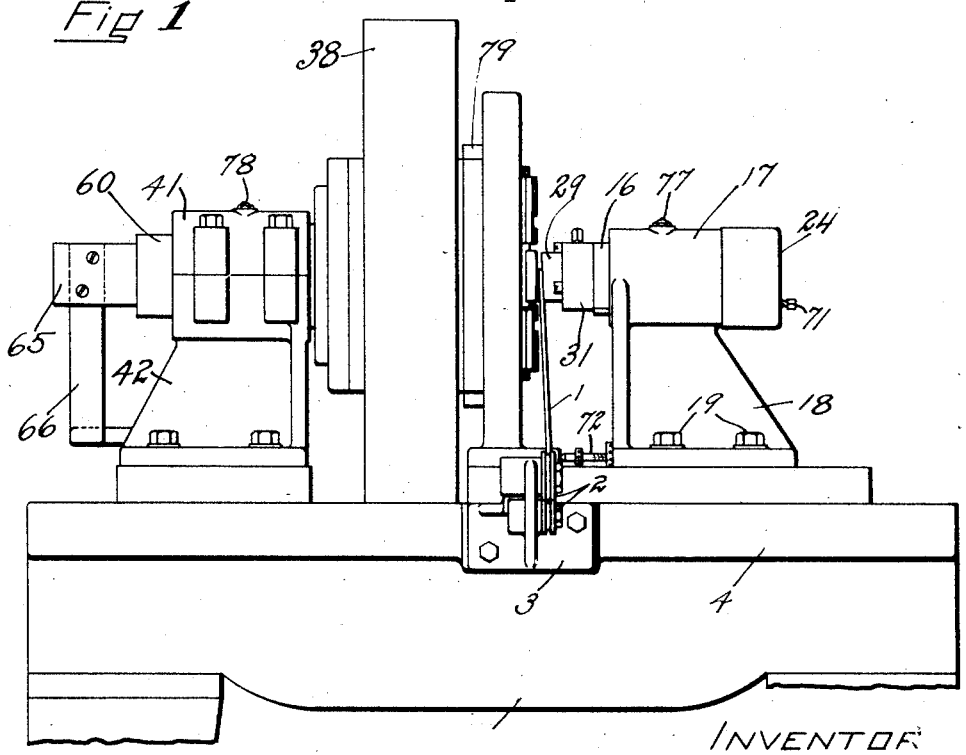
Fig. 2 is a left side elevation.
Figure 3:
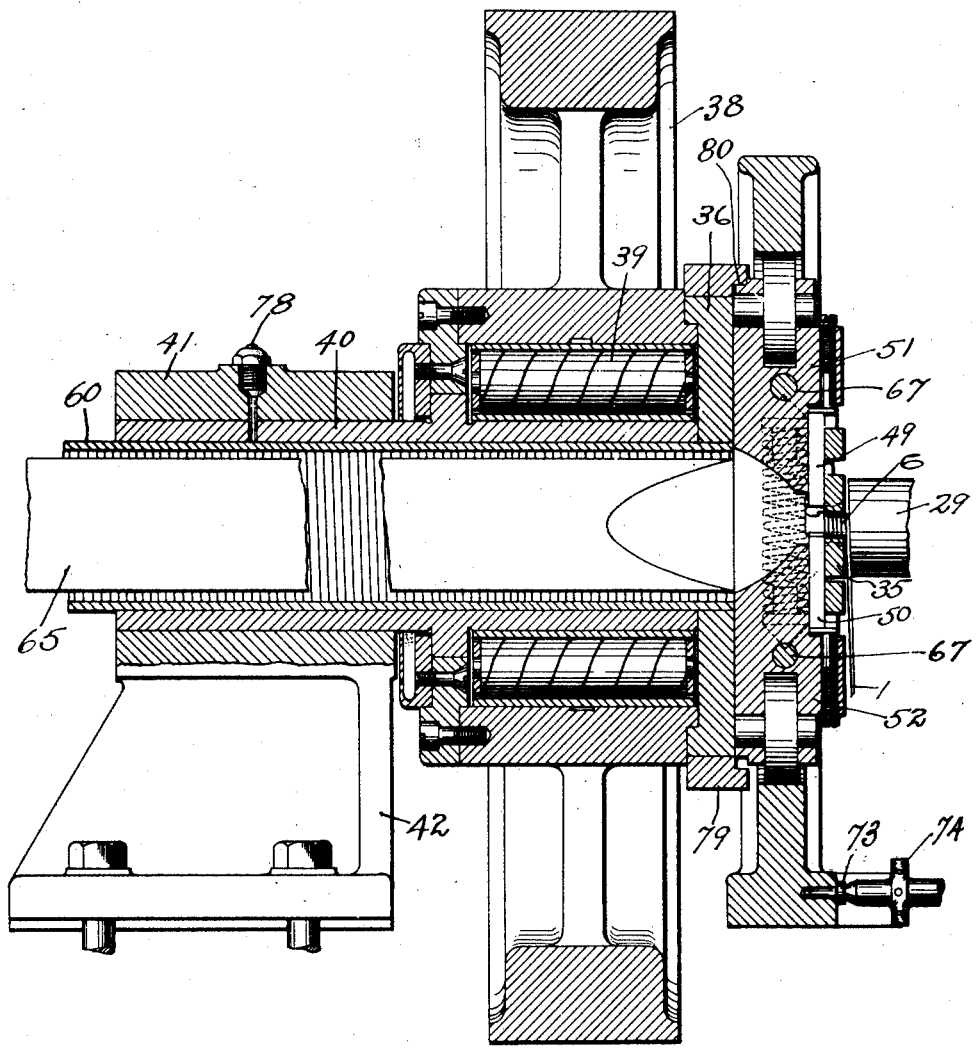
Fig. 3 is a detail in longitudinal sectional elevation, with the tail stock and the partition support broken away.
Figure 4:
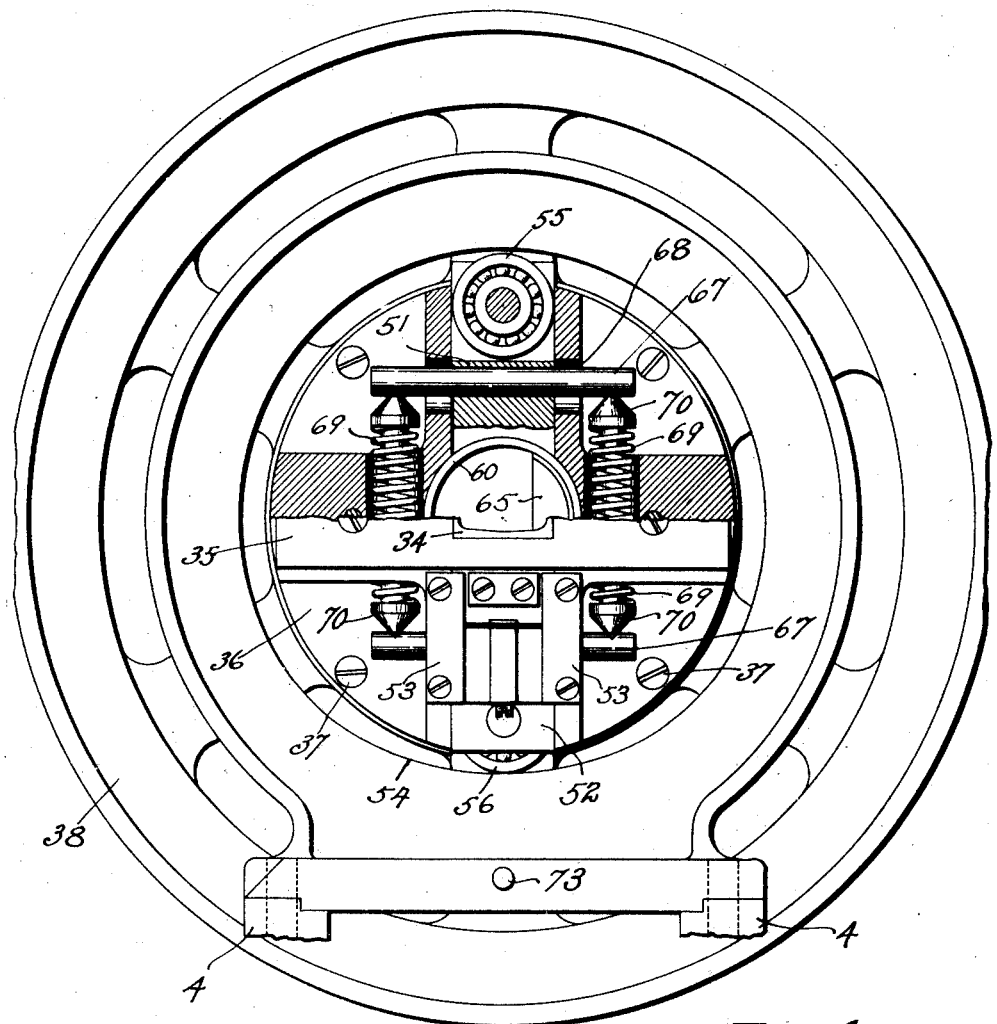
Fig. 4 is a detail in front elevation, partly in section, of the mechanism for operating the cutter.
Figure 12:
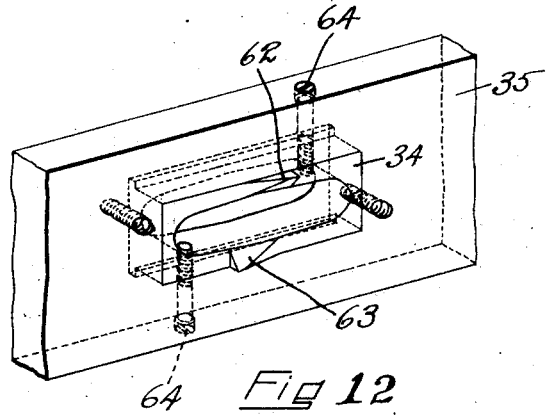
Fig. 12 is a detail, in isometric perspective, showing the mandrel rotator and some of the parts carried thereby.

The coils extend within and are loosely embraced by an insert 34 (Fig. 12) removably secured to a mandrel rotator 35 which is secured to a spider 36 (Figs. 3 and 4). The spider is secured by four screws 37 to a heavy fly-wheel pulley 38 (Figs. 3) which rotates on a series of roller bearings 39 interposed between the pulley and a stationary tube 40. The tube 40 is clamped (Figs. 1 and 2) to a bearing-like extension 41 (Fig. 3) of a bracket 42 secured to the frame 4.

Figure 13:
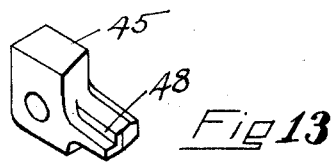
Fig. 13 is an isometric perspective of one of the coil stops.

During the continued rotation of the mandrel 5 the wire 1 is drawn from the source of supply and wound in coils about the mandrel. In order for each of the coils to be fed along the mandrel to make room for a fresh supply of wire the front end of the tube 29 (Fig. 5) is formed into a cam surface 43. This cam 43 engages the last coil of wire on the mandrel and pushes it with the other coils along the mandrel toward the front end thereof. The cam 43 holds the coil of wire at the free end of the mandrel against a pair of stops 44 and 45 (Figs. 7 and 13) secured by screws 46 and 47 to the rear face of the mandrel rotator 35 (Fig. 7). Each of the stops 44 and 45 is provided with a coil engaging shoulder 48 (Fig. 13) which is spaced a slight distance from the back wall of the insert 34.

With this construction the six coils of wire on the mandrel are firmly held between the cam 43 and the stops 44 and 45 so that there is no possibility for the loose wire at the free end of the mandrel to become displaced out of reach of the staple-severing instrumentalities.

The cam 43 feeds the coils on the mandrel a distance equal to the gauge of wire used at each rotation of the mandrel. To adapt the machine for operating upon wires of different gauges substitute tubes 29 are provided having different cam faces 43 thereon. One tube 29 may be removed and another substituted therefor merely by first unclamping and then clamping the bolt 30 (Figs. 5 and 6).

With the construction described rotation of the mandrel draws the wire from the source of supply and winds it in coils about the mandrel to shape the heads or shoulders of a plurality of staples, the cam face 43 acting to feed the coils toward the end of the mandrel where their advance is stopped by the stops 44 and 45.

In order to cut the wire diagonally between the shoulders intermediate each of the bends and thus form the points of the staples the spider 36 carries a pair of cutters 49 and 50 (Fig. 3). The cutter 49 is adjustably connected to a slide 51 while the cutter 50 is adjustably connected to a slide 52, cover plates 53 (Fig. 4) being provided to hold the slides 51 and 52 in place on the spider 36. The cutters 49 and 51 are operated by a stationary cam 54 bolted to the machine frame which engages cam rolls 55 and 56 on the slides 51 and 52, respectively.

During the rotation of the machine the cam rolls 55 and 56 travel continuously along the cam 54. When the cutters are in the position of Fig. 4 the lower cutter 50 is elevated by the cam 54 to shear through the wire at the end of the mandrel and form one end of the staple and separate it from the wire on the mandrel while the upper cutter 49 is thrown into an inoperative position by centrifugal force. At the time the lower cutter 50 is operating the mandrel is in the position of Fig. 7 which shows the position of the parts at the completion of a cut. As shown in Fig. 9 the cut made by the cutter is diagonally across the wire so that the same cut which forms one end of the staple points the end of the wire on the mandrel to form one end of the next staple, the other end of which is formed by the other cutter at the next half-revolution of the machine. With this construction two staples are formed at each revolution. The cam face 43 is designed to impart two quick feeding steps to the wire coils at each rotation of the machine with a dwell between each feeding step in order to temporarily suspend the feeding movement of the coils along the mandrel while a cutter is severing the wire. During the operation of the cutters to cut the wire the insert 34 (Fig. 12) acts as an anvil on the wire on the mandrel and corrects any tendency for the bend in the coil to bow across the top of the mandrel. This takes the spring out of the head of the staple.

Figure 11:
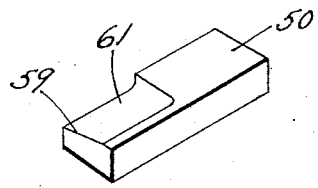
Fig. 11 is an isometric perspective showing one of the cutters removed from the machine.

In order to permit the cutters to shear diagonally across the wire the mandrel is provided with two reversely inclined shearing edges 57 and 58 (Fig. 10) which cooperate with the inclined cutting edge 59 (Fig. 11) on the cutters. The shearing edge 57 cooperates with the shearing edge 59 on the cutter 49 while the shearing edge 58 cooperates with the shearing edge 59 on the cutter 50. As the cutter 49 or 50 shears across its cooperating shearing edge 57 or 58 a completely formed staple is chopped off the wire on the mandrel and this staple drops into a tube 60 (Fig. 3) fitted to rotate with the spider 36.

In order to prevent accidental jamming of the staple in the space existing between the surface 61 on the cutters and the back face of the insert 34, the latter carries a pair of filling pieces 62 and 63 secured by screws 64 to the insert 34, one filling piece 62 cooperating with the cutter 49 and the other filling piece 63 cooperating with the cutter 50.

Figure 1:
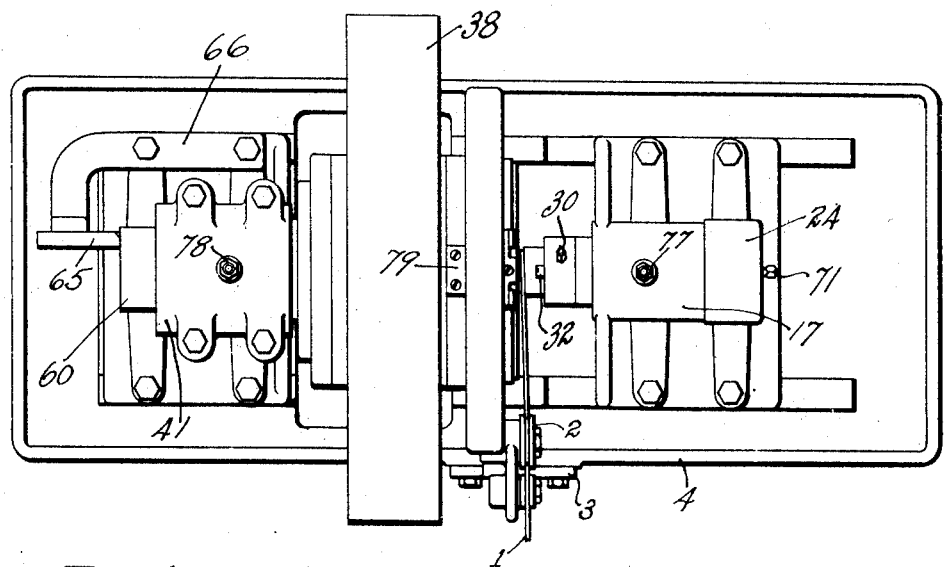

To insure the passage of the staples out of the machine the interior surface of the tube 60 (Fig. 3) is rifled. This rifling, during the rotation of the tube, carries the staples in the direction of the lead on the rifling to the open end of the tube 60 where the staples drop out into some suitable receptacle (not shown). The ejectment of the staples under the influence of the rifling is assisted by a stationary partition 65 which is supported by a bracket 66 on the machine frame and which extends within the tube 60 its entire length. As shown in Fig. 1 the partition 65 is located at some distance from the longitudinal center of the tube 60 so that it just clears the interior surface thereof.

Independently of the rifling or partition in the tube 60 the formed staples may be forcibly ejected clear out of the tube 60, particularly when the machine is running at normal speed, by the cutters themselves. Bearing in mind that the cam 43 and stops 44 and 45 are pressing on the opposite ends of the coils on the mandrel it will be apparent that considerable spring is stored in the wire coiled on the mandrel. When the cutter, which is in position to sever the staple from the wire on the mandrel, is actuated by the cam 54 its first engagement with the wire takes place while the wire is firmly held in position by the shoulder 48 on the stop 45. As it severs through the wire it elevates the free end of the wire above the surface of the stop 45 so that as the cutter completes its cut the formed staple is free to fly out over the stop 45 into the tube 60.

While the upper cam roll (Fig. 4) is held elevated by centrifugal force while the machine is running at speed, at the start and at the finish when the speed is less than normal the cam roll may not become so raised. To insure the elevation of the upper cutter (Fig. 4) at all times even if the machine is not running at normal speed the slides 51 and 52 are provided with cross rods 67 (Figs. 3 and 4) respectively, which work in slots 68 formed in the ways for the slides 51 and 52 on the spider 36. Interposed between the rods 67 are a pair of heavy springs 69 (Figs. 3 and 4), the opposite ends of which are coiled around the shanks of cone heads 70 engaged in slots formed in the rods 67.

In order to compensate for variations in the gauge of the wire in successive reels of wire located at the source of supply, which variation is known as the manufacturer's tolerance, the sleeve 16 is engaged by an adjusting screw-bolt 71 (Fig. 5) carried by the bearing 23. If the wire is slightly larger than standard the end of the wire will have a tendency to overlap the free end of the mandrel. By loosening the screw 71 the cam face 43 withdraws under pressure of the wire to the right (Fig. 5) and thus brings the end of the wire flush with the free end of the mandrel. If the wire is slightly smaller than standard the screw 71 is actuated to advance the cam face 43 and thus push the coils of wire along the mandrel until the end of the wire is flush with the free end of the mandrel. This manipulation of the screw 71 may be made while the machine is running as the variation from standard in the gauge of wire shows up in the finished staple one leg being longer than the other. When this occurs the operator manipulates the screw 71 either to advance or withdraw the cam 43 until the legs of the staple are again uniform. This adjustment varies the area of the coil supporting surface 7.

In order to provide for wear on the mandrel due to resharpening the shearing surfaces thereon the tail-stock 18 is provided with a screw 72, the other end of which butts up against a socket piece 73 carried by the supporting wall for the cam 54. The screw 72 is provided with adjusting and locking wheels 74 and 75 manipulation of which with a suitable tool engaged with holes 76 in their peripheries permits the tailstock 18 to be moved with relation to the supporting wall for the cam 54 and thus bring the point on the mandrel where the reversely inclined edges 11 cross again flush with the back wall of the insert 34. In making this adjustment of the tail-stock it is necessary first to unloosen the bolts 19 which pass through elongated holes in the tailstock and then tighten them after the adjustment has been made.

Although the machine is operated at a very high speed little heat is developed as it is found that the staples absorb most of the heat generated at the cutting point and this heat is withdrawn from the machine when the staples are ejected. Consequently little oiling is necessary except for the tube 60 and mandrel support 15 which are oiled through the ball and socket oiling devices 77 and 78 carried by the bearing-like extensions 17 and 41 (Figs. 3 and 5), respectively.

In order to provide a stop for the movement of the slides 51 and 52 in their outward movement under centrifugal force the spider 36 carries a strap 79 having a ledge 80 arranged to engage the upper end of the upper slide (Fig. 3).

As shown in Fig. 9 the machine of the present invention is designed to make a round wire staple such as the well-known poultry staple. To adapt the machine to make the square shouldered staple disclosed in my co-pending application hereinbefore referred to, or any other type of staple, the insert 34 (Fig. 12) is removed and another insert substituted therefor shaped to cooperate with the kind of wire employed in making a different form of staple.

It will be apparent to those skilled in this class of machines that changes may be made in the details of structure the described and illustrated embodiment thereof being intended as an exploitation of its underlying essentials, the features whereof will be definitely stated in their true scope in the claims hereto appended.

What is claimed as new is:

1. A staple-making machine, having, in combination, a mandrel rotatable to draw wire from a source of supply and coil the wire around the mandrel, means for preventing the mandrel moving longitudinally during its rotation and means for varying the normal area of the coil supporting surface of the mandrel during the rotation thereof.

2. A staple-making machine, having, in combination, a mandrel rotatable to draw wire from a source of supply and coil the wire around the mandrel, means for preventing the mandrel moving longitudinally during its rotation, a cam for feeding the coils along the mandrel, and means for relatively shifting the mandrel and the cam to vary the normal area of the coil supporting surface of the mandrel during the rotation thereof.

3. A staple-making machine, having, in combination, a mandrel rotatable to draw wire from a source of supply and coil the wire around the mandrel, a cam for feeding the coils along the mandrel, and means for adjusting the cam longitudinally of the mandrel during the rotation thereof.

4. A staple-making machine, having, in combination, a mandrel, a rotatable support therefor, a sliding sleeve within which the support rotates, a cam supported from the sleeve, and means for sliding the sleeve to vary the position of the cam longitudinally of the mandrel.

5. A staple-making machine, having, in combination, a mandrel, a support therefor, a sleeve surrounding the support, a collar secured to the sleeve, and a cam secured to the collar.

6. A staple-making machine, having, in combination, a mandrel, a rotatable support therefor, a sleeve within which the support rotates, a support for the sleeve, a bearing secured to the sleeve support, and an extension on the mandrel support, rotatably mounted on the bearing, provided with a socket.

7. A staple-making machine, having, in combination, a mandrel, a rotatable support therefor, a sliding sleeve within which the support rotates, a support for the sleeve, a bearing secured to the sleeve support, and an adjusting screw mounted on the bearing and arranged to engage the sleeve.

8. A staple-making machine, having, in combination, a mandrel having reversely inclined front edges, a rotator therefor, and means for relatively adjusting the mandrel and the rotator to maintain the point on the mandrel where the reversely inclined edges cross flush with the back face of the rotator.

9. A staple-making machine, having, in combination, a mandrel having reversely inclined front edges, a rotator therefor, a tailstock for supporting the mandrel, and means for adjusting the tail-stock to maintain the point on the mandrel where the reversely inclined edges cross flush with the back face of the rotator.

10. A staple-making machine, having, in combination, a mandrel rotatable to draw wire from a source of supply and coil the wire around the mandrel, a cam for feeding the coils along the mandrel, and means independent of the mandrel for stopping the advance of the coils by the cam.

11. A staple-making machine, having, in combination, a mandrel, a rotator independent of the mandrel for rotating the mandrel to draw wire from a source of supply and coil the wire around the mandrel, a cam for feeding the coils along the mandrel, and means on the rotator for stopping the advance of the coils by the cam.

12. A staple-making machine, having, in combination, a mandrel, a rotator independent of the mandrel for rotating the mandrel to draw wire from a source of supply and coil the wire around the mandrel, a cam for feeding the coils along the mandrel, and a pair of stops on the back face of the rotator for stopping the advance of the coils by the cam.

13. A staple-making machine, having, in combination, staple-forming devices, and means for ejecting the staples from the machine comprising a rotatable tube having its staple-engaging surface rifled.

14. A staple-making machine, having, in combination, staple-forming devices, primary means for ejecting the staples from the machine comprising a rotatable tube having its staple-engaging surface rifled, and secondary means for ejecting the staples comprising a stationary partition arranged at one side of the longitudinal axis of the tube and extended within the tube its entire length.

15. A staple-making machine, having, in combination, a mandrel rotatable to draw wire from a source of supply and coil the wire around the mandrel, means for holding the opposite ends of the coils firmly in position on the mandrel, and cutting mechanism independent of said means for chopping a staple out of the coils while they are held by said means.

16. A staple-making machine, having, in combination, a mandrel rotatable to draw wire from a source of supply and coil the wire around the mandrel, a cam for feeding the coils along the mandrel, a stop associated with the free end of the mandrel for stopping the advance of the coils by the cam, and a cutter for chopping a staple out of the wire on the mandrel and for elevating the chopped out staple above the stop.

17. A staple-making machine, having, in combination, a mandrel having an inclined shearing edge, a rotator for rotating the mandrel to draw wire from a source of supply and coil the wire around the mandrel, a cutter having an inclined cutting edge cooperating with the shearing edge on the mandrel to chop out a staple from the wire on the mandrel, and means for preventing a staple from jamming in the space between the cutter and the back face of the rotator.

In testimony whereof I have signed my name to this specification.

CHARLES C. BLAKE.